United States Patent                                                                 [11] 3,627,592

| [72] | Inventors | Paul Schmidt |
| | | Frankfurt am Main; |
| | | Klaus Hennemann, Hofheim, Taunus, both of Germany |
| [21] | Appl. No. | 15,881 |
| [22] | Filed | Mar. 2, 1970 |
| [45] | Patented | Dec. 14, 1971 |
| [73] | Assignee | Messer Griesheim GmbH |
| | | Frankfurt am Main, Germany |
| [32] | Priority | Mar. 13, 1969 |
| [33] | | Germany |
| [31] | | P 19 12 649.9 |

[54] METHOD OF PRODUCING WELDING FLUX
4 Claims, No Drawings

[52] U.S. Cl. .................................................... 148/26, 148/23, 148/24, 219/73, 106/313
[51] Int. Cl. ...................................................... B23k 35/36
[50] Field of Search ........................................... 148/24, 23, 26; 219/73; 23/313, 210; 106/121, 104, 313

[56] References Cited
UNITED STATES PATENTS

| 2,043,960 | 6/1936 | Jones et al. ................... | 148/26 X |
| 2,355,988 | 8/1944 | Mathias ........................ | 148/24 X |
| 2,694,023 | 11/1954 | Hopkins ...................... | 148/26 |
| 3,185,599 | 5/1965 | Arnold et al. ................ | 148/26 |
| 3,501,354 | 3/1970 | De Long ..................... | 148/23 |

FOREIGN PATENTS

| 553,170 | 5/1943 | Great Britain ................ | 148/26 |

Primary Examiner—L. Dewayne Rutledge
Assistant Examiner—G. T. Ozaki
Attorney—Ernest F. Marmorek ABSTRACT: A method for the preparation of an agglomerated welding flux, especially for use in submerged arc welding and electroslag welding processes, wherein the components of the welding flux are mixed with a binding agent, while adding water thereto, to form a doughy mass; the doughy mass is then dried and calcined at a temperature at which the hydroxides are converted to their respective oxides. The binding agent is aluminum hydroxide, magnesium hydroxide or combinations thereof.

METHOD OF PRODUCING WELDING FLUX

BACKGROUND OF THE INVENTION

The invention relates to a method for the preparation of a welding flux, and relates more particularly to a welding flux used especially as an additive agent in the course of electroslag welding operations and in the course of submerged arc-welding processes.

It has been known heretofore to prepare welding flux for submerged arc-welding processes and for electroslag welding processes, by fusion or agglomeration of the components of the welding flux. During the agglomeration process the components of the welding flux are, for example, treated with sodium silicate ($Na_2SiO_3$) or organic binding agents. Subsequent to said treatment, the mixture is dried, calcined and broken up into small pieces. The agglomeration process is used most often in dealing with welding flux components which fuse only under great difficulty; however, it has the disadvantage that due to the binding agents which heretofore have been used and required, the composition of the finished flux was frequently changed into an undesirable product because of said process. Thus, to give an example, when sodium silicate ($Na_2SiO_3$ was used as the binding agent, silicic acid and alkaline metals contaminated the finished flux product. The degree of basicity of the flux is lowered by the addition of silicic acid, while on the other hand, the alkali content is not lowered enough, that is it remains too high; the alkali content will have an influence on the welding characteristics of the flux. When organic binding agents are used such as alginates of carbohydrates, relatively low-carbon quantities get into the welding flux and thereby the contamination factor is reduced. This method, however, has its drawbacks in that when the aforesaid organic binding agents are used an undesired carburization of the article to be welded results.

SUMMARY OF THE INVENTION

It is an object of the present invention to provide a method of producing a welding flux of the type generally set forth hereinafter which will obviate the aforementioned drawbacks of the prior art.

It is a further object of the invention to provide a relatively inexpensive, easily fabricated, easily workable and reliable welding flux.

Another object of the invention is to establish a method for the preparation of agglomerated welding fluxes, especially those used in submerged arc-welding processes and in electroslag welding operations.

A further object of the invention is to provide such a flux without the utilization of silicic acid or alkali or carbon-containing binding agents.

Other objects and advantages of the invention will be set forth in part in the following specification and in part will be obvious therefrom without being specifically referred to, the same being realized and attained as pointed out in the claims hereof.

With the above and other objects of the invention in view, the invention consists in the novel methods, as set forth in the claims hereof and described in the specification.

In accordance with the present invention it is suggested that the components of the welding flux are mixed with one another, and are stirred to a doughy mass while adding hydroxides of aluminum and/or magnesium, which serve as the binding agent, together with a sufficient amount of water so that the resulting mixture is subsequently dried and calcined at such temperature that will permit the conversion of the hydroxides into their respective oxides.

By utilizing the hydroxides of aluminum and/or magnesium as the binding agent it is possible to prepare a desired welding flux of such composition so as to obviate the aforesaid secondary drawbacks heretofore encountered in welding flux production.

During the drying and calcination of the welding flux those components thereof that had been treated with the aforesaid binding agents will undergo a calcination of the hydroxides therein. The oxides which remain behind, however, form the connective structure, as well as a major portion of the resultant agglomerate. The foregoing prevents an increase in the amount of silicic acid, alkali and carbon content.

It has proved to be especially suitable to prepare welding fluxes for the electroslag welding operations by means of the aforesaid method in accordance with the instant invention, wherein calcium silicate and calcium fluoride are used as the components of the welding flux and aluminum hydroxide as the binding agent. If a welding flux is prepared using the above-mentioned components, the finished flux has a relatively low-silicic acid content.

The required contents of calcium oxide and silicic acid in the finished flux can be essentially predetermined, since the binding agent does not bring about any changes in calcium oxide and the silicic acid content during the preparation procedures as occurs in the case of heretofore known preparation procedures for agglomerated welding fluxes.

With respect to the preparation of welding flux for the submerged arc-welding process it has proven to be of advantage when the components of the welding flux are calcium silicate and manganese silicate and the binding agents are aluminum and magnesium hydroxides.

With the aforesaid components a welding flux may be prepared which likewise does not have a large silicic acid content and moreover the alkali content is practically nil. The finished welding flux has a relatively high-basicity, as well as a high current-carrying capacity.

The following examples, which are not to be considered as limiting, illustrate the details for a method of the preparation of an agglomerated welding flux, especially for those used in submerged arc-welding processes and in electroslag welding operations, without the utilization of silicic acid and alkali and carbon-containing binding agents.

The percentages are based on weight.

EXAMPLE 1

An electroslag welding flux is prepared in the following manner wherein the calcium oxide content is as high as possible, and the silicic acid content is as low as possible. The final composition of the flux should be the following, namely: 25 percent calcium oxide (CaO), 25 percent silicon dioxide ($SiO_2$), 30 percent calcium fluoride ($CaF_2$), and 20 percent aluminum oxide ($Al_2O_3$).

In order to obtain, for example, 100 kg. of this flux, a raw material mixture consisting of 50 kg. calcium silicate, 30 kg. calcium fluoride, and 30 kg. aluminum hydroxide is stirred in a sufficient amount of water so as to form a doughy mass. The latter is dried, calcined at a temperature of at least 1,000° C. and subsequently comminuted to a desired grain size. The overall calcination process permits the aluminum hydroxide to be calcined; and as a subsequent stoichiometric calculation shows, the finished product yields a 20 percent aluminum oxide content.

EXAMPLE 2

A welding flux for the submerged arc-welding process can be prepared as hereinafter described, wherein both the basicity and the current-carrying capacity thereof will be as high as possible. The foregoing is accomplished by maintaining a low-silicic acid content while at the same time insuring that the alkali content will be practically nil. The final composition of the flux should be as follows: 40 percent calcium silicate, 40 percent manganese silicate, 10 percent aluminum oxide and 10 percent magnesium oxide.

In order to obtain, for example, 100 kg. of this welding flux, a raw material mixture consisting of 40 kg. calcium silicate, 40 kg. manganese silicate, 15 kg. aluminum hydroxide and 14.5 kg. magnesium hydroxide are stirred with a sufficient amount of water so as to produce a doughy mass. The latter is dried, calcined at a temperature of at least 1,000° C. and subsequently comminuted to the desired grain size.

We wish it to be understood that we do not desired to be limited to the exact details of construction shown and described, for obvious modifications will occur to a person skilled in the art.

Having thus described the invention, what we claim as new and desired to be secured by Letters Patent, is as follows:

We claim:

1. A method for the preparation of an agglomerated welding flux, especially for submerged arc-welding and electroslag welding processes, the steps comprising, mixing components of the welding flux with aluminum hydroxide which serves as a binding agent, adding water while continuing to mix, allowing said mixture to form a doughy mass, while continuing to add water thereto, drying said doughy mass, calcinating said doughy mass at such temperature that said binding agent is converted to its respective oxide.

2. In a method, as claimed in claim 1, wherein said welding flux is comprised of calcium silicate and calcium fluoride.

3. A method for the preparation of an agglomerated welding flux, especially for submerged arc-welding and electroslag welding processes, the steps comprising, mixing components of the welding flux with the hydroxides of aluminum and magnesium, said hydroxides serving as a binding agent, adding water while continuing to mix, allowing said mixture to form a doughy mass, while continuing to add water thereto, drying said doughy mass, calcinating said doughy mass at such temperature that said hydroxides comprising said binding agent are converted to their respective oxides.

4. In a method, as claimed in claim 3, wherein said welding flux is comprised of calcium silicate and manganese silicate.

* * * * *